UNITED STATES PATENT OFFICE.

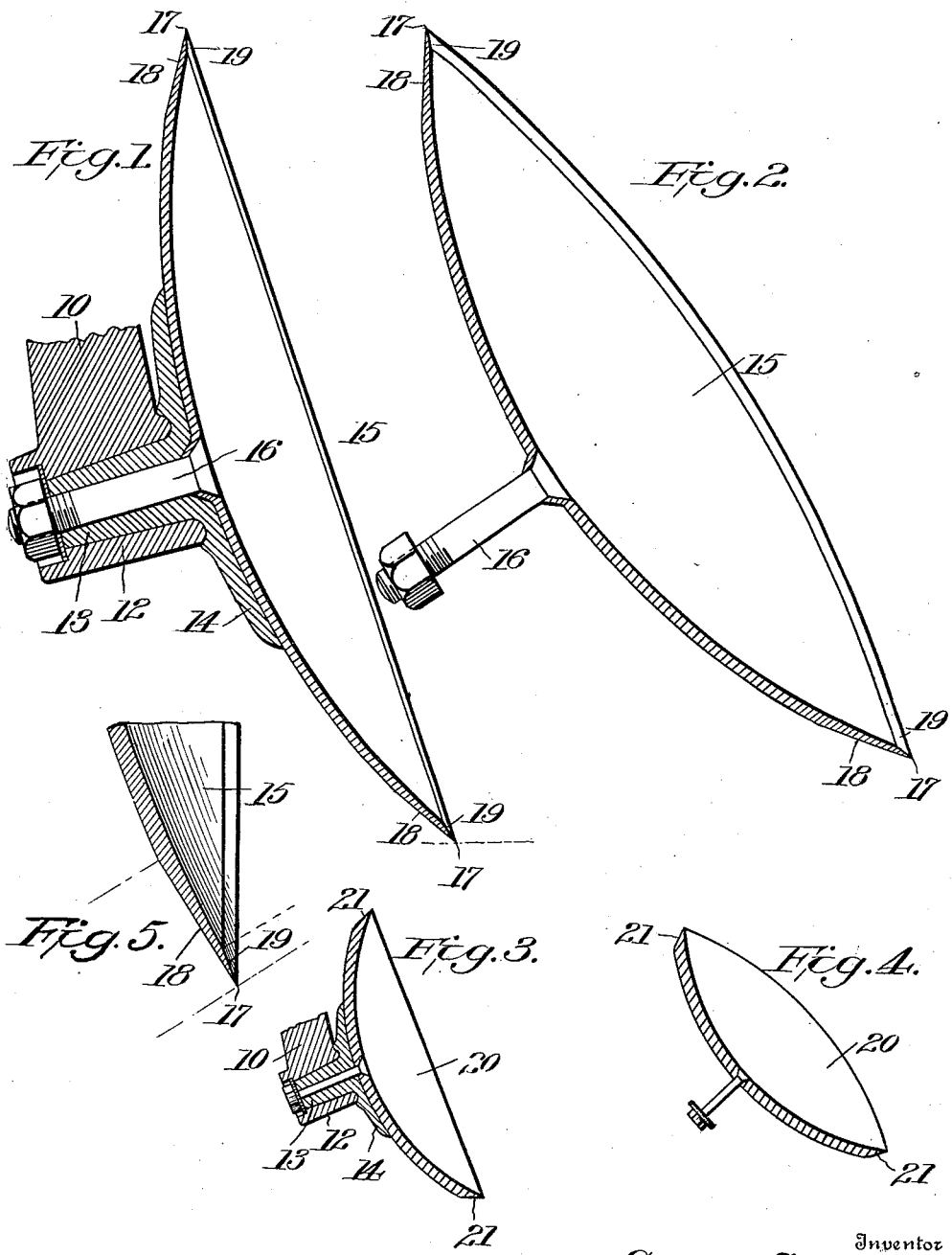

GEORGE SPALDING, OF STOCKTON, CALIFORNIA.

CONCAVE DISK.

1,007,399.  Specification of Letters Patent.  Patented Oct. 31, 1911.

Application filed February 24, 1909. Serial No. 479,728.

*To all whom it may concern:*

Be it known that I, GEORGE SPALDING, of Stockton, in the county of San Joaquin, State of California, have invented certain new and useful Improvements in Concave Disks, of which the following is a specification.

This invention relates to concave disks of the kind used in plows, cultivators and tilling machines wherein rotary disks are employed.

As known to those familiar with the art, rotary disks are admirably adapted for the uses required of them in such implements, and one of the objects of the present invention is to provide a form of disk suitable for the purpose provided with a sharp and durable edge. When in use for any of the purposes mentioned the faces of the disk are inclined back and to the rear on the side to which the plowed earth is turned, and in recent practice where rotary disks are employed for plowing the earth, it is not unusual to tilt them back toward the rear with the top toward the unplowed ground, and to incline the planes of their faces to the front and toward the plowed ground at their bottoms.

In plowing with implements of the type mentioned, it is essential to the best results, that as they are moved forward a portion of the back, or convex side, of each disk, next its rim and adjoining the cutting edge, shall constantly come in contact with the land side, or upper part of the wall of the furrow, on the side next the unplowed ground in order to resist the lateral, or side thrust of the disk, toward the unplowed ground. Otherwise, if the portion of the disk immediately behind its cutting edge does not come in contact with the top of the land side, or upright wall of the furrow, the disk will tend to "run in," or "take too much land," and accordingly cut a wider furrow than is desired. On the other hand, if the portion of the back of the disk around its rim and adjoining its cutting edge, shall be full and press too hard against the land side, the disk will be "crowded out" and cut a furrow narrower in width than is desired.

When a rotary disk is adjusted and used to plow a furrow of any given width, the friction on its convex side adjoining its rim will in time wear it into proper shape to keep in touch with the wall of the furrow along the unplowed ground. As these disks are usually made, however, the effect of this wear upon them is such that they are likely to be either in the condition of having an edge too thin to be durable and suitable for encountering the hard knocks to which they may be subjected; or else, in the condition of having their edges "dubbed off," so that they are unfit for use unless again sharpened.

Among other objects, the present invention seeks to overcome the objections mentioned by constructing a disk of improved form and beveling it around the cutting edge on both the inner and outer faces thereof, whereby the bevel on the outside will conform with the landside of its furrow when the disk is in operation.

Heretofore rotary disks used for the purposes mentioned have been made of sheet metal of about one-eighth of an inch in thickness and have been in approximately the form of slices of hollow spheres, dished in their centers to about one-sixth of their diameter across their faces. Thus it has been customary, when using disks twenty-four inches in diameter across their faces, to dish them four inches, or thereabout, in their centers.

The preferred embodiment of the invention herein described involves using disks less dished in their centers than those just described, although I do not desire to limit myself in this particular, as it is obvious that considerable variations may be made in such disks, without sacrificing any of the advantages arising from said invention.

The invention will be hereinafter fully set forth and particularly pointed out in the claim.

In the accompanying drawings:—Figure 1 is a vertical cross section of a disk embodying my invention, said section being taken through the center and at right angles to the face of the disk, the lower edge of the disk being illustrated as resting on the bottom of its furrow. Fig. 2 is a horizontal sectional view taken through the center of the disk illustrating the latter in the position in which it is used in its furrow. Fig. 3 is a vertical sectional view illustrating a disk of a type or pattern heretofore used, the edge being "dubbed off" to correspond with the line of the bottom of its furrow. Fig. 4 is a horizontal sectional view of the form of disk illustrated in Fig. 3, with its edge presented to the wall or landside of its furrow, as in operation. Fig. 5 is an enlarged detail view illustrating the cutting edge of my improved disk.

Referring to the drawings, and particularly to Figs. 1 and 2, 10 designates a standard carried by a suitable frame 11, and provided with a bearing 12 adapted to receive the tapered hub 13 of a disk supporting flange 14. The disk 15 is secured to said flange by means of a bolt 16 passed through a suitable opening in the center of the disk and extended through a bore formed in the hub 13. Said disk 15 is concaved and provided with a cutting edge 17, formed by beveling the outer face of the disk adjacent the rim, as indicated at 18, and by also providing a second bevel 19 on the inner face meeting the bevel 18. It will be noted in this connection that the bevel 18 is considerably longer than the bevel 19, the latter conforming substantially to the plane of the face of the disk.

By beveling the disk in the manner described, a keen cutting edge is provided, and said disk is well sustained by sufficient thickness of metal at its base to render it strong and serviceable. As the disk on its outer bevel is worn by friction against the land side and bottom of the furrow the bevel on the inner side is worn to some extent by the plowed earth as it passes out of the rear side of the face of the disk. In case this wear is not sufficient, however, to preserve the bevels of their proper relative dimensions, the bevel 19 may be corrected and a sharp edge provided by using an ordinary file and passing the same back and forth across the rim of the disk, with the end of the file coming inside of the rim, held in plane of the face of the disk, or depressed in the dish or hollow of the disk, so as to make the edge of the desired angle. In this manner, with a little care, the form of the edge may be varied at pleasure, and a very keen cutting edge may at all times be readily provided.

Referring to Figs. 3 and 4 it will be observed that the disk 20 is beveled or "squared" at 21 on the back next to the cutting edge in the line of draft. It is obvious that a disk of this shape, with its edge squared off, as shown, is wholly impracticable for plowing purposes, not only because of its being dull, but for the further reason that in operation, as a result of the pressure on its landside, it will be "crowded out", laterally, from the unplowed ground so that it cannot cut a furrow of the desired width. Moreover, it is wholly impracticable to make or wear a bevel on the outer rim and adjoining the edge of the disk of the form of bevel 21, so that said bevel will press against the landside of the furrow, for the reason that the form of the disk is such that a bevel cannot be so made, or worn, without either cutting through the disk back of its edge, or making the edge so very thin that it will be weak and useless for practical purposes, especially in ground where it would encounter rocks, roots, or be given strains by other means.

I claim as my invention:—

A disk for tilling machines comprising a continuously curved concavo-convex body, a portion of the outer face of said body being flattened in a straight line to form an annular rim, the inner edge of said rim being provided with a bevel arranged at an angle to the plane of the rim and also at an angle to the inner face of the disk, said bevel reaching the outer edge of the rim, said bevel being narrower than the width of said rim.

In testimony whereof, I have signed this specification in the presence of two subscribing witnesses.

GEORGE SPALDING.

Witnesses:
ROBT. W. WISTAR,
E. S. HANSON.

---

Copies of this patent may be obtained for five cents each, by addressing the "Commissioner of Patents, Washington, D. C."